United States Patent
Kinsel et al.

(10) Patent No.: US 10,498,132 B2
(45) Date of Patent: Dec. 3, 2019

(54) METHODS AND APPARATUS TO DISABLE A TRIP CIRCUIT DURING SELF TEST IN GROUND FAULT CIRCUIT INTERRUPTERS

(71) Applicant: Siemens Industry, Inc., Alpharetta, GA (US)

(72) Inventors: Hugh T. Kinsel, Sugar Hill, GA (US); Joselito Endozo, Dacula, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 424 days.

(21) Appl. No.: 15/588,895

(22) Filed: May 8, 2017

(65) Prior Publication Data

US 2018/0323605 A1    Nov. 8, 2018

(51) Int. Cl.
*H02H 3/33* (2006.01)
*H01H 83/04* (2006.01)

(52) U.S. Cl.
CPC ......... *H02H 3/335* (2013.01); *H01H 83/04* (2013.01)

(58) Field of Classification Search
CPC .......... H02H 3/335; H02H 3/334; H02H 3/33; H01H 83/04; H01H 71/24; H01H 69/00; H01H 9/54

USPC .......................................................... 361/42
See application file for complete search history.

(56) References Cited

U.S. PATENT DOCUMENTS

| | | | |
|---|---|---|---|
| 6,421,214 B1 * | 7/2002 | Packard | H02H 3/335 361/7 |
| 8,476,992 B2 | 7/2013 | Biedrzycki | |
| 9,214,309 B2 | 12/2015 | Watford | |
| 9,570,262 B1 | 2/2017 | Thomas et al. | |
| 2010/0295568 A1 * | 11/2010 | Ostrovsky | G01R 31/3277 324/750.3 |
| 2013/0088310 A1 | 4/2013 | Biedrzycki | |
| 2015/0068881 A1 | 3/2015 | Watford | |
| 2016/0141862 A1 | 5/2016 | Endozo et al. | |

* cited by examiner

*Primary Examiner* — Kevin J Comber

(57) ABSTRACT

A ground fault circuit interrupter (GFCI) having an automatic self-test feature is configured to disable a trip circuit therein during a self test, yet still allow the trip circuit to respond during the self test to detection of a large ground fault by tripping a main contact switch of the GFCI. The GFCI includes circuitry that overrides the disablement of the trip circuit during a self test in response to detection of a ground fault that exceeds a predetermined threshold. Methods of disabling a trip circuit of a GFCI during a self test while still allowing the trip circuit to respond during the self test to detection of a large ground fault are also provided, as are other aspects.

20 Claims, 13 Drawing Sheets

METHODS AND APPARATUS TO DISABLE A TRIP CIRCUIT DURING SELF TEST IN GROUND FAULT CIRCUIT INTERRUPTERS

FIELD

This disclosure relates to ground fault circuit interrupters and, more particularly, to ground fault circuit interrupters that disable a trip circuit therein during a self test.

BACKGROUND

Ground fault circuit interrupters (GFCIs) are a type of electronic circuit breaker that may be used in some electrical systems to protect an electrical circuit from ground faults. A ground fault may exist when a current imbalance occurs between a power (or hot) conductor and a neutral conductor of an electrical circuit. GFCIs may be used to prevent electrical shock hazards in electrical circuits that are adjacent to water, such as, e.g., in bathrooms and/or kitchens. Upon detection of a ground fault, a trip circuit within the GFCI may be activated to interrupt or disconnect power (i.e., current flow) from an electrical power source to the protected electrical circuit.

To ensure that a GFCI is operating properly, GFCIs may have a self-test feature that automatically checks the functionality of the GFCI at regular intervals, such as, e.g., every two or three hours. During a self test, the trip circuit may be disabled to prevent the GFCI from unnecessarily disconnecting power from the protected electrical circuit. However, a potentially hazardous situation may exist if a large ground fault occurs in the protected electrical circuit at the onset of the self test. That is, the GFCI may not respond to detection of a ground fault until after the self test concludes. Another potentially hazardous situation may also exist if a self-test controller within the GFCI malfunctions by, e.g., outputting a trip circuit disable signal that is stuck at either a logic high level or a logic low level. Such a stuck signal may permanently disable the trip circuit and thus prevent the GFCI from disconnecting power in response to detection of a ground fault.

Accordingly, there is a need for methods and apparatus that disable a trip circuit of a GFCI during a self test and yet still allow the trip circuit to respond during the self test to detection of a large ground fault.

SUMMARY

According to one aspect, a ground fault circuit interrupter is provided. The ground fault circuit interrupter includes a ground fault detection circuit configured to output a ground fault signal in response to detecting a ground fault caused by a test current or a ground fault current. The ground fault circuit interrupter also includes a trip circuit configured to open a switch coupled between a power source and a load in response to receiving the ground fault signal. The ground fault circuit interrupter further includes a self-test controller and a switching circuit. The self-test controller is configured to periodically enter a test mode by outputting a clock signal, and the switching circuit is configured to receive the clock signal and to respond thereto by disabling the trip circuit to prevent the opening of the switch in response to the detecting of the ground fault caused by the test current. The trip circuit is further configured to open the switch in response to the detecting of the ground fault caused by the ground fault current exceeding a threshold during the test mode.

According to another aspect, a method is provided of disabling a trip circuit in a ground fault circuit interrupter. The method includes outputting a clock signal in response to entering a test mode of the ground fault circuit interrupter, disabling a trip circuit of the ground fault circuit interrupter in response to the outputting of the clock signal to prevent opening of a switch coupled between a power source and a load in response to detection of a ground fault caused by a test current, and overriding the disabling of the trip circuit during the test mode to allow the opening of the switch in response to detection of a ground fault caused by a ground fault current exceeding a threshold.

According to a further aspect, a method of assembling a ground fault circuit interrupter is provided. The method includes providing a self-test controller configured to periodically enter a test mode by outputting a clock signal at an output of the self-test controller, providing a switching circuit configured to disable a trip circuit to prevent a switch coupled between a power source and a load from opening, and coupling a capacitor serially between the output of the self-teat controller and an input pin of the switching circuit.

Still other aspects, features, and advantages in accordance with these and other embodiments of the disclosure may be readily apparent from the following detailed description, the appended claims, and the accompanying drawings. Accordingly, the drawings and descriptions herein are to be regarded as illustrative in nature, and not as restrictive.

BRIEF DESCRIPTION OF DRAWINGS

The drawings, described below, are for illustrative purposes only and are not necessarily drawn to scale. The drawings are not intended to limit the scope of this disclosure in any way.

DETAILED DESCRIPTION

Figure 1:
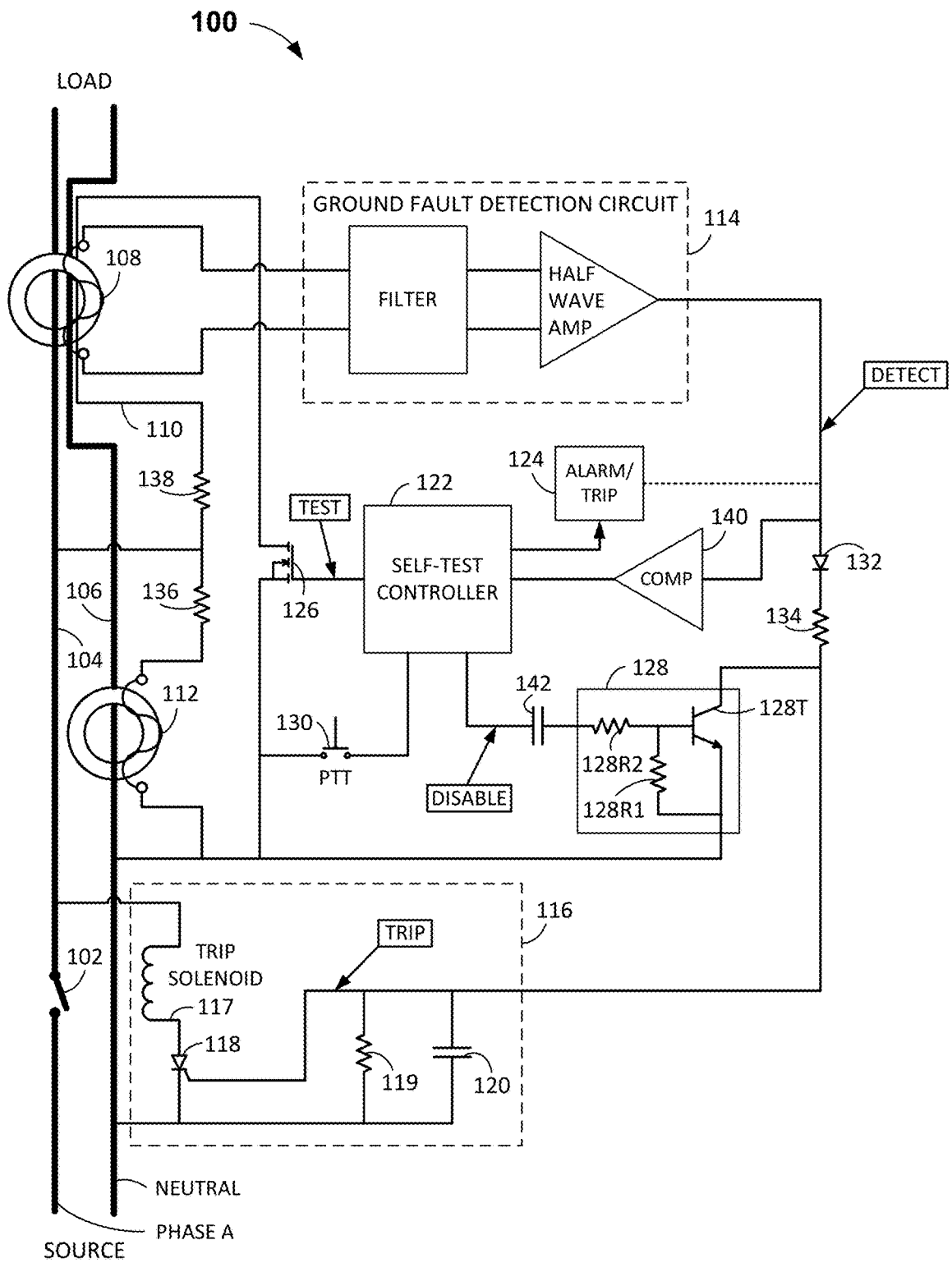
FIG. 1 illustrates a schematic diagram of a ground fault circuit interrupter (GFCI) according to embodiments.

Reference will now be made in detail to the example embodiments of this disclosure, which are illustrated in the accompanying drawings. Wherever possible, the same reference numbers will be used throughout the drawings to refer to the same or like parts.

Ground fault circuit interrupters (GFCIs) may have a self-test controller that automatically performs periodic self tests of the GFCI to ensure that the GFCI is functioning properly—namely, that a ground fault in a protected electrical circuit is detected. During a self test, the GFCI may apply a test current through a differential current sensing transformer of the GFCI and may then monitor the output of a ground fault detection circuit of the GFCI. The amplitude of the test current should be greater than the detection sensitivity threshold of the ground fault detection circuit. Depending upon the electrical system being protected and the ground fault detection circuit implementation, the duration of a self test could be two or more half cycles of the electrical power source (e.g., 17 msec). To prevent unnecessary power disruptions to the protected electrical circuit during the self test, a trip circuit of the GFCI is disabled. However, this creates a potentially hazardous condition should a higher current ground fault (i.e., a ground fault current higher than the test current) occur at the same time as the onset of a self test. Moreover, industrial standards (such as, e.g., Underwriters Laboratories standard UL 943) require, among other things, that GFCIs disconnect power from a protected electrical circuit within 25 msec for a 264 mA ground fault. This standard may not be met if a ground fault occurs during a self test. Another potentially hazardous condition could occur if a self-test controller malfunctions and outputs a trip circuit disable signal that is stuck at either a logic high level or a logic low level (which may be caused by, e.g., a transient voltage surge or an end of life electrical component failure). Such a stuck signal may permanently disable the trip circuit and prevent the GFCI from tripping open a main contact switch of the GFCI to disconnect power from the protected electrical circuit should detection of a ground fault occur.

In one or more aspects, a GFCI is configured to allow its ground fault detection circuit to trip open the GFCI's main contact switch in response to detection during a self test of a large ground fault (i.e., a ground fault having a current imbalance higher than a test current used during a self test). The GFCI is also configured to allow the ground fault detection circuit to trip open its main contact switch as in normal operation in response to detection of a ground fault that occurs even though the self-test controller outputs a trip circuit disable signal stuck at either a logic high or low level.

In other aspects, methods of disabling a trip circuit of a GFCI during a self test while still allowing the trip circuit to respond during the self test to detection of a large ground fault, and methods of assembling a GFCI, are provided, as will be explained in greater detail below in connection with FIGS. 1-14.

FIG. 1 illustrates a GFCI 100 in accordance with one or more embodiments. GFCI 100 includes a main contact switch 102 that connects electrical power to a protected electrical circuit (e.g., a load); a hot conductor 104 that supplies power (e.g., 120 VAC Phase A power) to the load; a neutral conductor 106 that provides a current return path; a differential current sensing transformer 108 that has hot conductor 104, neutral conductor 106, and a test conductor 110 passing there through; a current transformer 112 that has neutral conductor 106 passing there through; a ground fault detection circuit 114 that includes a filter and half-wave amplifier (or a full-wave rectifying amplifier); a trip circuit 116 that includes a trip solenoid 117, an SCR (silicon or semiconductor controlled rectifier) 118, a resistor 119, and a capacitor 120; a self-test controller 122 coupled to an alarm/trip circuit 124 that may provide an audible or visual alarm and/or may be coupled to trip circuit 116 to energize trip solenoid 117 and open main contact switch 102; a MOSFET 126; a bipolar transistor switching circuit 128 configured to disable trip circuit 116; and a push-to-test (PTT) button 130.

GFCI 100 has two modes of operation: a normal mode and a test mode. GFCI 100 is configured to monitor the current through hot and neutral conductors 104 and 106 to detect a ground fault or a grounded neutral fault during the normal mode of operation. Upon detection of a ground or grounded neutral fault of sufficient magnitude, power is disconnected from the load via trip circuit 116 causing main contact switch 102 to open. Periodically, GFCI 100 automatically enters the test mode (i.e., performs a self test) to check the functionality of differential current sensing transformer 108 and ground fault detection circuit 114. If the result of the self test is "pass," then GFCI 100 returns to the normal mode of operation. If the result of the self test is "fail," then an audible or visual alarm is activated by alarm/trip circuit 124 and/or a signal is sent from alarm/trip circuit 124 to trip circuit 116 (optional connection there between shown in phantom) to disconnect power from the load by opening main contact switch 102. A GFCI that fails a self test should be immediately replaced.

During the normal mode of operation, the differential current sensing transformer 108 monitors the hot and neutral conductors 104 and 106 for a current imbalance. Any imbalance of current sensed by differential current sensing transformer 108 is coupled to ground fault detection circuit 114. Ground fault detection circuit 114 may, in some embodiments, include a low pass filter and a half-wave amplifier. The output of ground fault detection circuit 114 is coupled to the gate of SCR 118 via diode 132 and resistor 134. During normal mode, switching circuit 128 remains off with an internal resistor 128R1 electrically connected between the base and the emitter of an NPN bipolar transistor 128T, pulling the voltage potential of the base to the same voltage potential as the emitter. Capacitor 120, electrically connected between the gate and cathode terminals of SCR 118, together with resistor 134 form an additional low pass filter. Resistor 119, also electrically connected between the gate and cathode terminals of SCR 118, discharges capacitor 120 thus preventing SCR 118 from turning on while there is insufficient fault current or current imbalance sensed by differential current sensing transformer 108. Diode 132 prevents capacitor 120 from discharging through resistor 134. When a sufficiently large fault current or current imbalance is sensed by differential current sensing transformer 108, ground fault detection circuit 114 charges capacitor 120 until the voltage on the gate of SCR 118 exceeds the turn-on threshold, which in some embodiments may be about 0.5 V. In response, SCR 118 turns on, energizing trip solenoid 117, which opens main contact switch 102, thus disconnecting power from the load.

Also, should neutral conductor 106 be mistakenly connected to earth ground at the load, the current generated through a resistor 136 and the secondary winding of transformer 112, which is electrically connected between hot conductor 104 and neutral conductor 106, is coupled by transformer 112 onto neutral conductor 106. This creates a sufficiently large current imbalance sensed by differential current sensing transformer 108. In response, ground fault detection circuit 114 charges capacitor 120 until the voltage on the gate of SCR 118 exceeds the turn-on threshold. SCR 118 then turns on energizing trip solenoid 117, thus disconnecting power from the load by opening main contact switch 102.

Periodically, GFCI 100 enters the test mode of operation. Self-test controller 122 automatically may a self test, in some embodiments, immediately after power on and then at least every three hours thereafter to meet the requirements of UL 943. Self-test controller 122 may be a microprocessor and in some embodiments may be part number ATtiny261A-MN, manufactured by ATMEL. As mentioned above, GFCIs performing a self test should disconnect power from a protected electrical circuit within 25 msec for a 264 mA ground fault to meet the requirements of UL 943. However, because a GFCI's trip circuit is disabled during a self test, and a successful self test could take up to 17 msec, some known GFCIs may not detect the ground fault and disconnect power until the end of the next cycle of Phase A power, which may exceed the UL 943 limit of 25 msec. In one or more embodiments, GFCI 100 is advantageously configured to meet the requirements of UL 943 by responding to a large ground fault (e.g., 264 mA or greater) within the 25 msec limit during a self test. In one or more embodiments, GFCI 100 is also advantageously configured to overcome a malfunctioning self-test controller outputting a stuck DISABLE signal. In particular, self-test controller 122 is configured to assert a clock signal on node DISABLE, and GFCI 100 includes a series capacitor 142 configured to couple and differentiate the clock signal on node DISABLE, as now described in detail.

Figure 2:
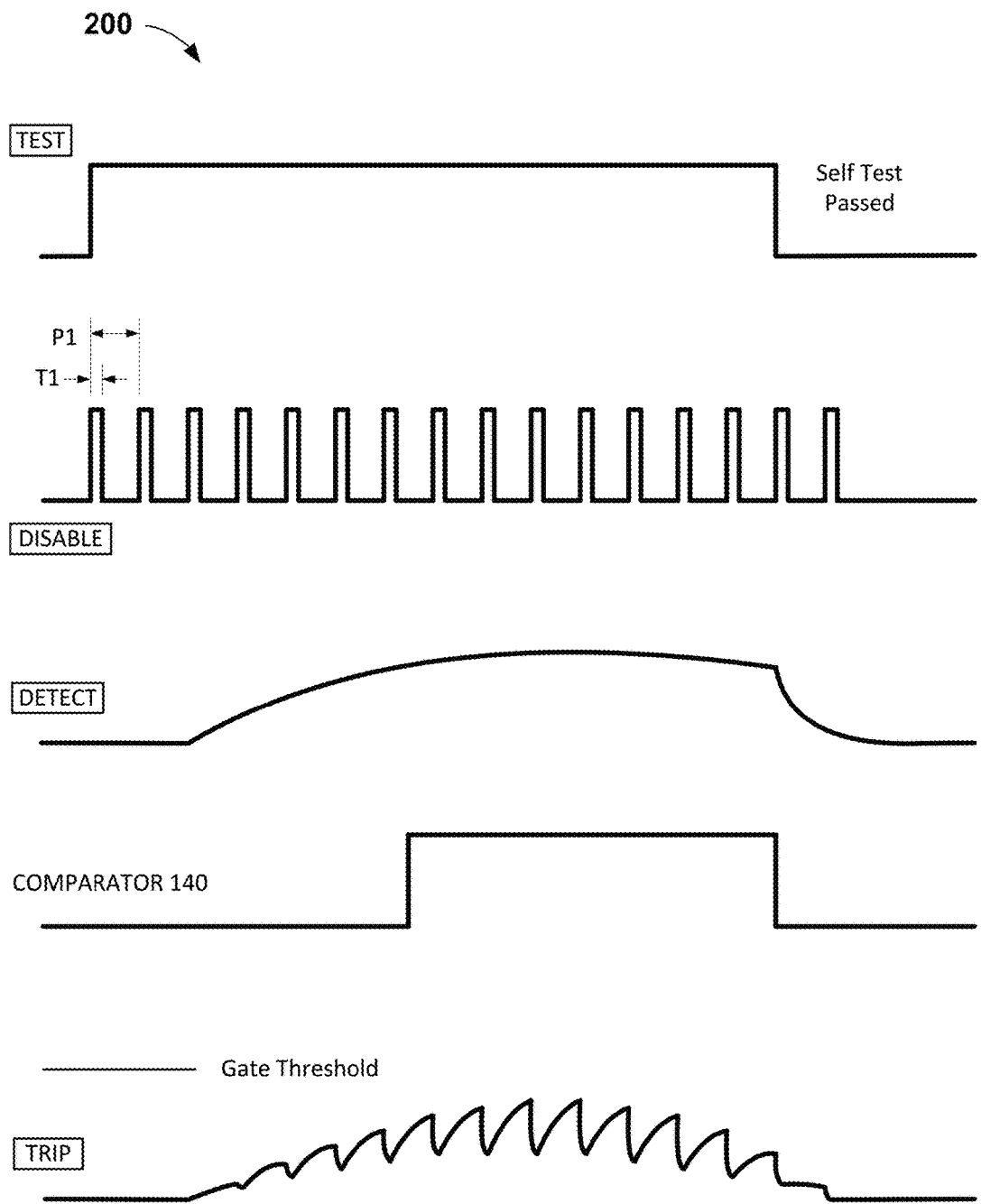
FIG. 2 illustrates signal waveforms of a passing self test in the GFCI of FIG. 1 according to embodiments.

During the test mode of operation, self-test controller 122 asserts a signal at node TEST (see signal waveforms 200 of GFCI 100 shown in FIG. 2). (As used herein, a "signal," unless otherwise indicated, should be understood to be a logic high level signal; in other embodiments, reverse logic and corresponding circuitry may alternatively be used wherein logic low level signals may be asserted). The signal at node TEST is electrically coupled to the gate of MOSFET 126. In some embodiments, MOSFET 126 may be part number BSS127S-7 manufactured by Diodes, Incorporated. In response to the signal at node TEST, MOSFET 126 turns on allowing a test current of about 8 mA in some embodiments to flow from hot conductor 104 (providing, e.g., 120 VAC) through resistor 138, which is electrically coupled to neutral conductor 106 via test conductor 110. Test conductor 110 passes through differential current sensing transformer 108. In some embodiments, resistor 138 may be a 15 kΩ, 0.25 W resistor.

Simultaneously, self-test controller 122 asserts a clock signal at node DISABLE (see FIG. 2) which is electrically coupled to the input pin of switching circuit 128 via capacitor 142. The clock signal is further electrically coupled via internal resistor 128R2 to the base of bipolar transistor 128T. In some embodiments, capacitor 142 may be 0.01 µF. Capacitor 142 may have other values. In some embodiments, switching circuit 128 may be part number DTC144EMT2L manufactured by Rohm and/or resistors 128R1 and 128R2 may each be 47 kΩ. The clock signal may in some embodiments have a frequency of 2 kHz (P1=500 µsec) and have a 25% duty cycle (T1=125 µsec at 5 V, and 375 µsec at 0V) as shown in FIG. 2. Other frequencies, duty cycles, and signal levels may be used. For example, in some embodiments, the duty cycle may range from 24% to 26%, the frequency may range from of 1.8 kHz to 2.2 kHz, and/or signal levels may range from 3 V to 0 V. In other embodiments, the ranges of these parameters may depend on other circuit parameters, such as, e.g., the output signal level of ground fault detection circuit 114, values of resistors 119 and 134, value of capacitor 120, and/or the gate turn-on threshold of SCR 118. Capacitor 142 has one terminal electrically connected to self-test controller 122 and the other terminal connected to an input pin of switching circuit 128, which is electrically coupled through internal resistor 128R2 to the base of bipolar transistor 128T. Capacitor 142 differentiates the clock signal asserted by self-test controller 122 and electrically couples the resulting signal to internal resistor 128R2. The effect is that switching circuit 128 turns on briefly at the leading edge of every pulse of the clock signal asserted by self-test controller 122, electrically coupling node TRIP (which is the gate terminal of SCR 118) to neutral conductor 106. Thus, capacitor 120, which may be 4.7 µF in some embodiments and has one terminal electrically connected to the gate terminal of SCR 118 and the other terminal electrically connected to the cathode terminal of SCR 118, is repeatedly and briefly discharged as shown in FIG. 2. This prevents the output signal of ground fault detection circuit 114 at node DETECT, produced in response to the test current (of, e.g., 8 mA), from charging capacitor 120 via diode 132 and resistor 134 to a voltage exceeding the turn-on threshold of the gate of SCR 118, which prevents the energizing of trip solenoid 117. In some embodiments, SCR 118 may be part number S6X8BSRP manufactured by Little Fuse.

Self-test controller 122 monitors node DETECT via comparator 140, which asserts a signal into self-test controller 122 while the output signal from ground fault detection circuit 114 at node DETECT is above a predetermined value. Self-test controller 122 may determine that a self test passes (i.e., that differential current sensing transformer 108 and ground fault detection circuit 114 are functioning properly) when comparator 140 asserts a signal into self-test controller 122 for at least a predetermined amount of time, which in some embodiments may be about 1 msec and in other embodiments may range from 0.1 msec to 8.3 msec. Upon a self test "passing," self-test controller 122 ceases to assert a signal at node TEST and ceases to assert a clock signal at node DISABLE, as shown in FIG. 2, wherein GFCI 100 returns to the normal mode of operation.

Figure 3:
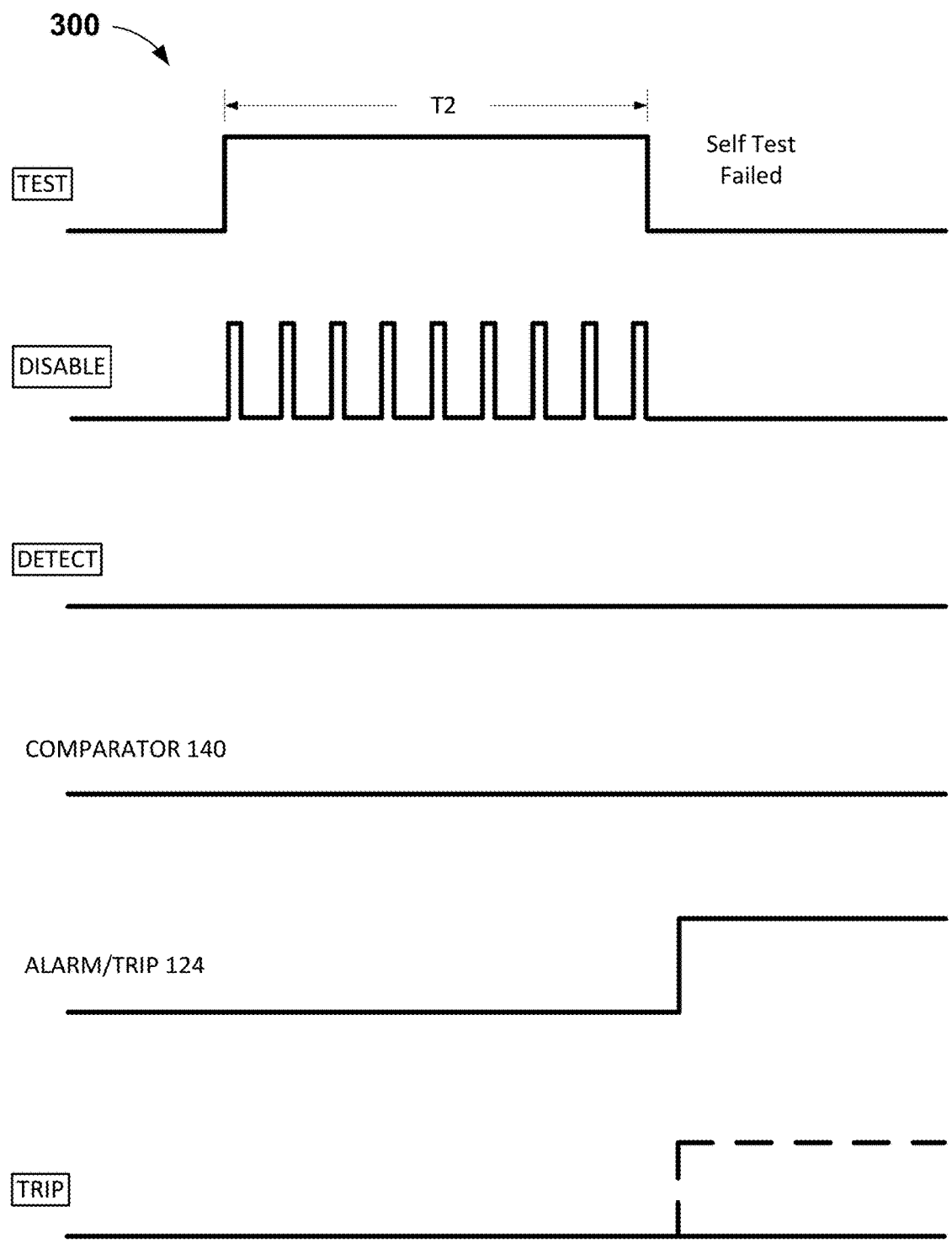
FIG. 3 illustrates signal waveforms of a failing self test in the GFCI of FIG. 1 according to embodiments.

Should differential current sensing transformer 108 or ground fault detection circuit 114 cease functioning properly, a self test will fail (see signal waveforms 300 of GFCI 100 shown in FIG. 3). Self-test controller 122 asserts a signal at node TEST and a clock signal at node DISABLE upon entering the test mode of operation. A test current (of about 8 mA in some embodiments) is induced in test conductor 110, which passes through differential current sensing transformer 108. However, if the differential current sensing transformer 108 or ground fault detection circuit 114 ceases to function properly, then an expected output signal from ground fault detection circuit 114 will not be present on node DETECT as shown in FIG. 3. Accordingly, comparator 140 does not assert a signal into self-test controller 122. After a predetermined period of time, which may be about T2=25 msec in some embodiments, self-test controller 122 ceases to assert respective signals at nodes TEST and DISABLE and asserts a signal to alarm/trip circuit 124, which generates an audible or visual alarm and/or is coupled to node TRIP to turn on SCR 118 and energize trip solenoid 117 to open main contact switch 102.

A defective ground fault detection circuit 114 may possibly result in a logic high level output signal that remains present on node DETECT. In this case, SCR 118 turns on and energizes trip solenoid 117, which opens main contact switch 102 each time GFCI 100 is powered on. Accordingly, this should indicate to a user that GFCI 100 is defective and requires replacement.

The trip time required by UL 943 is 25 milliseconds for a 264 mA ground fault as defined by:

$$T=(20/I)^{1.43}$$   Equation 1 where I is the ground fault current in mA.

Figure 4:
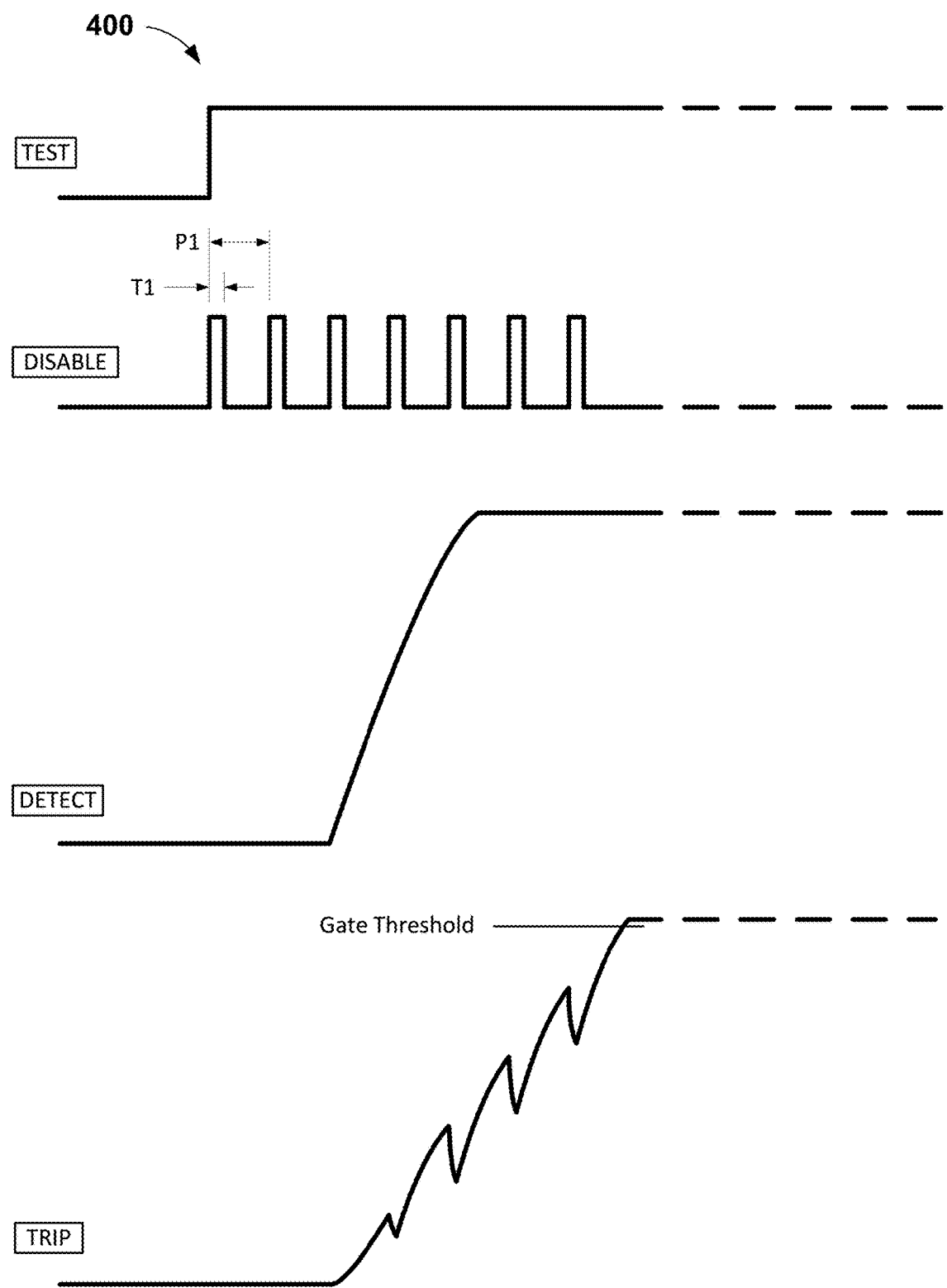
FIG. 4 illustrates signal waveforms of the GFCI of FIG. 1 responding to a large ground fault occurring during a self test according to embodiments.

GFCI 100 is configured to trip and disconnect power from a protected electrical circuit (e.g., the load) within 25 msec should a large and/or dangerous ground fault (i.e., 264 mA or greater) occur during a self test, as shown in FIG. 4, which illustrates signal waveforms 400 of GFCI 100 in accordance with one or more embodiments. The output signal of ground fault detection circuit 114 at node DETECT asserted in response to a fault current of 264 mA charges capacitor 120 (which may be about 4.7 uF in some embodiments) via diode 132 and resistor 134 faster than the effect of switching circuit 128 repeatedly and briefly turning on at the leading edge of every pulse of the clock signal asserted by self-test controller 122 at node DISABLE (which repeatedly and briefly discharges capacitor 120). Thus, the output signal of ground fault detection circuit 114 at node DETECT causes capacitor 120 to charge to a voltage exceeding the turn-on threshold of the gate of SCR 118. In response, SCR 118 turns on and energizes trip solenoid 117, which opens main contact switch 102, disconnecting power from the load.

In some embodiments, GFCI 100 may also prevent trip circuit 116 from being disabled should self-test controller 122 malfunction and output a disable signal stuck in a logic high or logic low level during a self test. Such a malfunction may occur, e.g., because of an environmental condition such as a transient voltage surge or an end of life electrical component failure. Should the output disable signal of self-test controller 122 get stuck in the test mode, the signal asserted on node DISABLE would not be a clock signal but rather a logic high level, which in some embodiments may be +5 V, or a logic low level, which in some embodiments may be 0 V. Capacitor 142 (of about 0.01 µF in some embodiments) blocks the logic high level from coupling to the input pin of switching circuit 128. Thus, switching circuit 128 remains off with internal resistor 128R1 electrically connected between the base and the emitter of bipolar transistor 128T pulling the voltage potential of the base to the same voltage potential as the emitter. Similarly, switching circuit 128 remains off in the same manner should self-test controller 122 get stuck in test mode asserting a logic low level on node DISABLE. Should self-test controller 122 get stuck and assert a signal on node TEST, then the resulting test current (of about 8 mA in some embodiments) is sensed by the differential current sensing transformer 108 and coupled to ground fault detection circuit 114 producing a signal at node DETECT. Since switching circuit 128 remains off, the output signal from ground fault detection circuit 114 on node DETECT is coupled via diode 132 and resistor 134 to node TRIP, which is the gate of SCR 118. Over a few cycles of Phase A electrical power, capacitor 120 (which may be about 4.7 µF in some embodiments) charges until the voltage on node TRIP exceeds the turn-on voltage of the gate of SCR 118. SCR 118 then turns on and energizes trip solenoid 117, which opens main contact switch 102 disconnecting power from the load. Should self-test controller 122 get stuck and not assert a signal on node TEST, then GFCI 100 continues to function as in the normal mode of operation described above. In any of these self-test controller 122 malfunctions, GFCI 100 advantageously either trips or continues to function normally should a dangerous ground fault condition occur.

Figure 5:
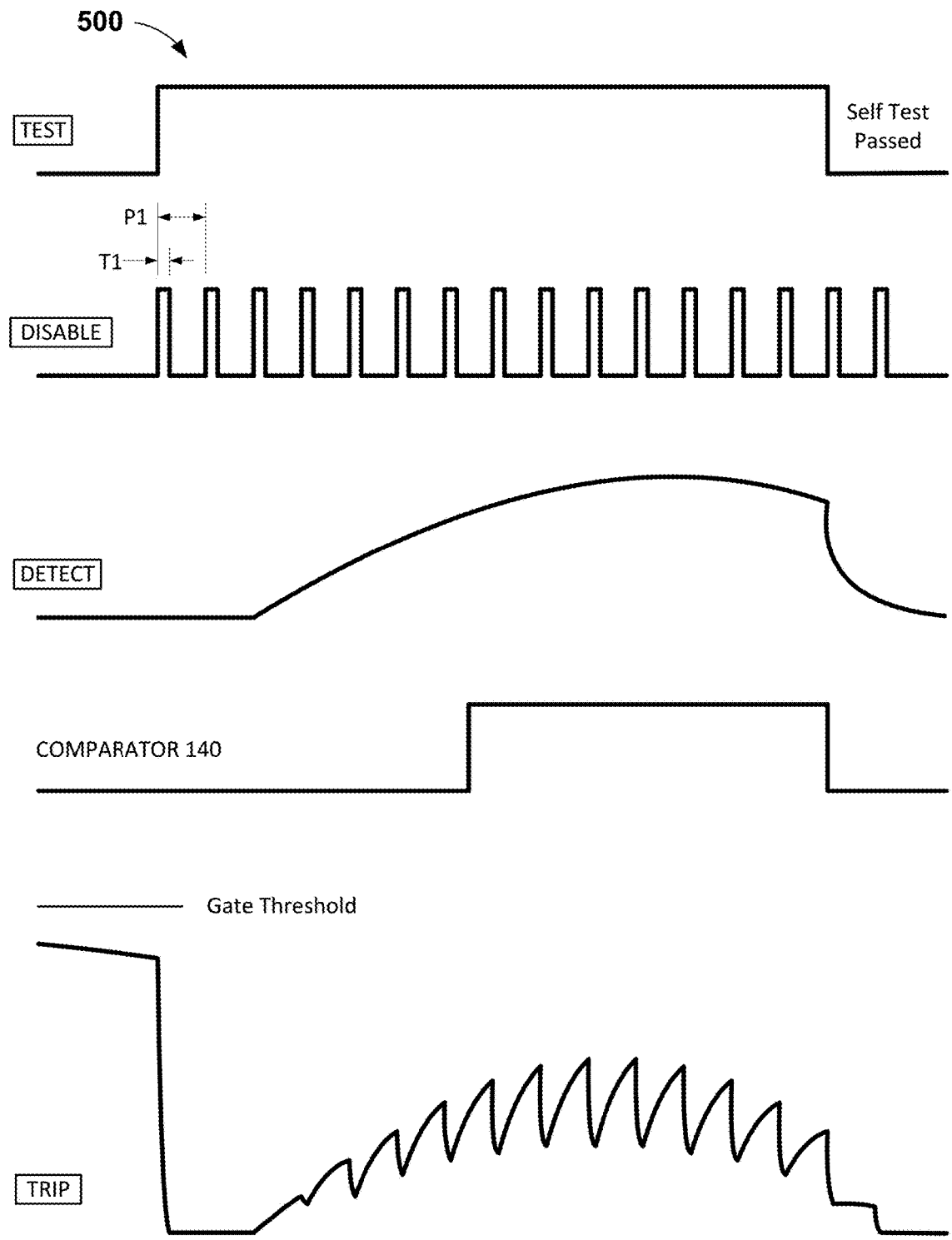
FIG. 5 illustrates signal waveforms of the GFCI of FIG. 1 responding to a below-threshold ground fault occurring during a self test according to embodiments.
Figure 6:
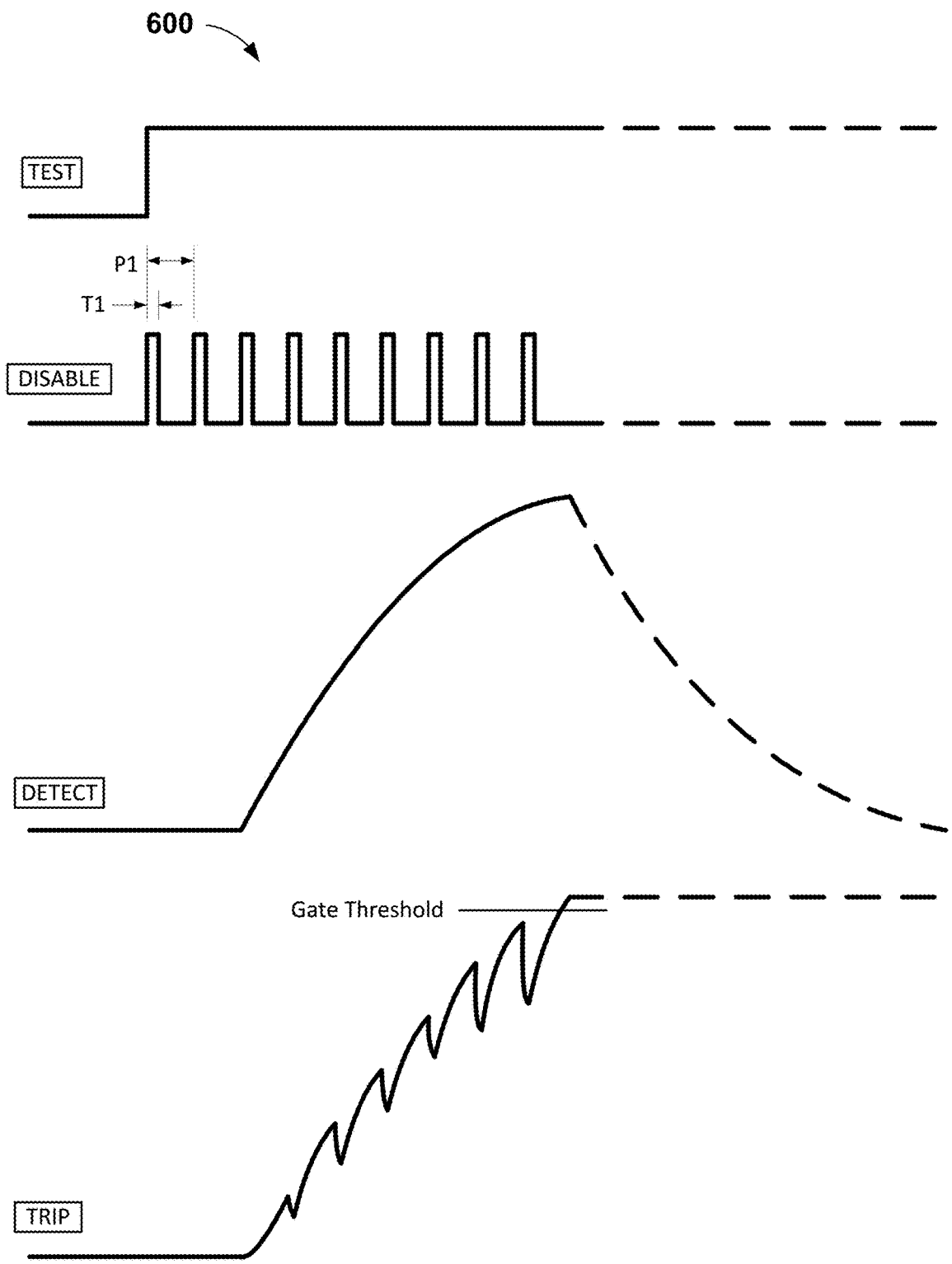
FIG. 6 illustrates signal waveforms of the GFCI of FIG. 1 responding to an above-threshold ground fault occurring during a self test according to embodiments.
Figure 7:
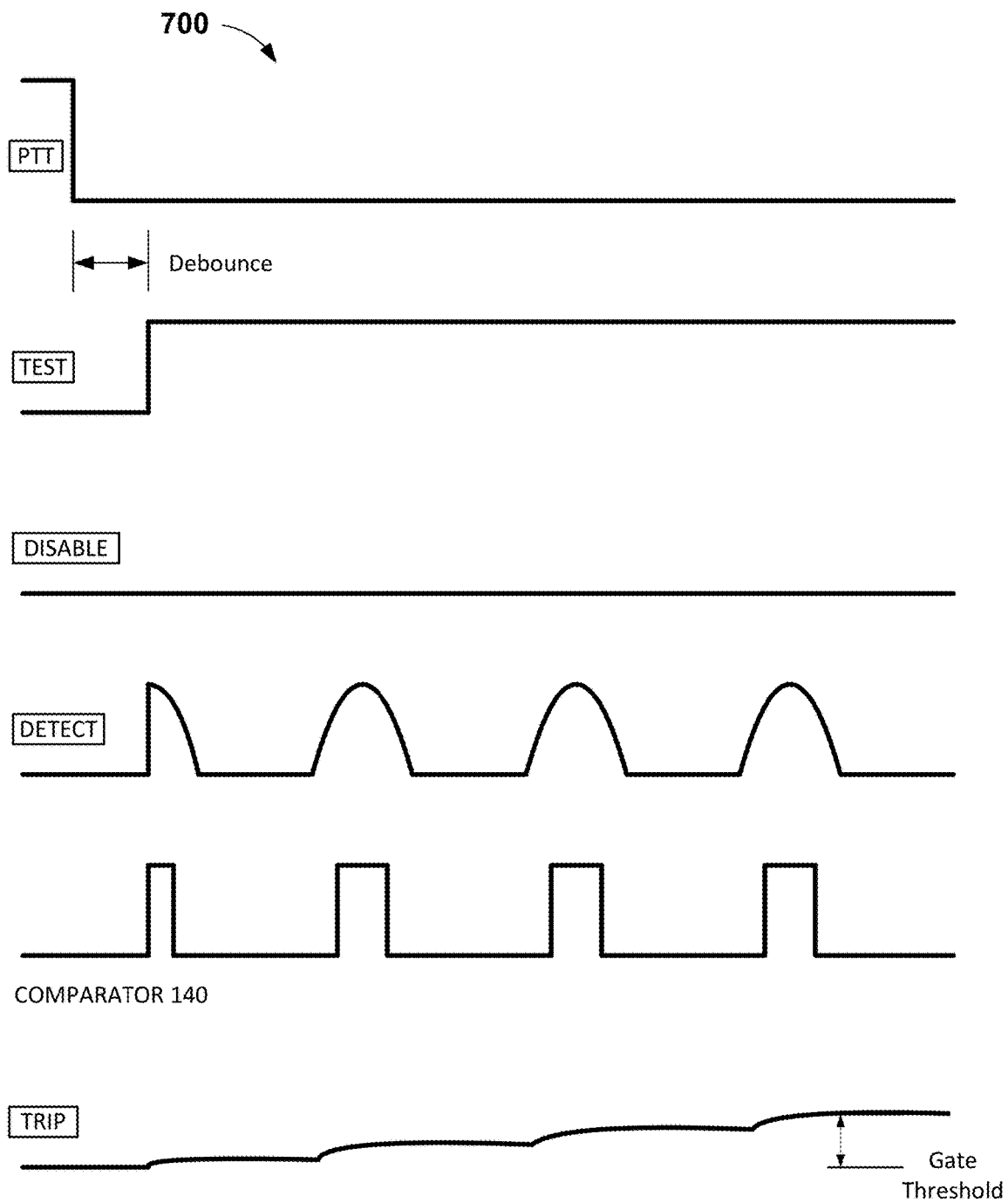
FIG. 7 illustrates signal waveforms of the GFCI of FIG. 1 responding to a manual test according to embodiments.

The values of resistor 134, capacitor 120, resistor 119, and capacitor 142, along with the frequency, duty cycle, and amplitude of the clock signal asserted by self-test controller 122 on node DISABLE are selected as described above such that GFCI 100 does not unintentionally trip during a self test should a nearly 4 mA ground fault occur. The DL 943 standard requires that the trip sensitivity threshold of a GFCI be in the range of 4 to 6 mA. Thus, a GFCI should not trip when a below-threshold ground fault (i.e., less than or nearly 4 mA) occurs. As shown in FIG. 5, which illustrates signal waveforms 500 of GFCI 100 responding to a below-threshold ground fault in accordance with one or more embodiments, a charge on capacitor 120 (see node TRIP) is less than the gate turn-on voltage of SCR 118 due to a near 4 mA ground fault. At the onset of a self test, capacitor 120 is discharged rapidly, preventing the voltage on node TRIP from exceeding the gate turn-on voltage of SCR 118 during the self test. With the selected parameters described above, ground fault detection circuit 114 is configured to trip should an above-threshold ground fault (of, e.g., 20 mA) occur at the same time a self test is initiated for the self-test controller 122 (see FIG. 6, which illustrates signal waveforms 600 of GFCI 100 responding to an above-threshold ground fault in accordance with one or more embodiments). The trip time required by UL 943 is 1 second for a 20 mA ground fault as defined by Equation 1 above. For ground fault currents between 6 mA and 20 mA that occur at the same time a self test is initiated, ample time exists for GFCI 100 to execute a self test and then respond to the ground fault and trip open main contact switch 102 to disconnect power from the load.

In some embodiments, a user may also initiate a manual test of GFCI 100 by pressing PTT button 130, which may be located on a face (not shown) of GFCI 100. If a GFCI is functioning properly, the user should notice the GFCI tripping (i.e., disconnecting power from the load). If the GFCI is not functioning properly, the user should notice power remaining connected to the load (i.e., the GFCI not tripping) and activation of an audible or visual alarm, in which case, the user should immediately replace the GFCI. More particularly, self-test controller 122 detects that a circuit was closed by the pressing of PTT button 130 for about 20 msec in some embodiments for debouncing (see FIG. 7, which illustrates signal waveforms 700 of GFCI 100 during a manual test in accordance with one or more embodiments). Self-test controller 122 asserts a signal at node TEST, but does not assert a signal at node DISABLE. In response, MOSFET 126 turns on allowing a test current of about 8 mA in some embodiments to flow from hot conductor 104 through resistor 138, which is electrically coupled to neutral conductor 106 by test conductor 110. Test conductor 110 passes through differential current sensing transformer 108. The current imbalance is sensed by differential current sensing transformer 108 and coupled to ground fault detection circuit 114, which produces a signal at the output node DETECT. This signal is coupled to the gate of SCR 118 via diode 132 and resistor 134. After a few power source cycles, capacitor 120 (see node TRIP) charges to a voltage that exceeds the gate turn-on threshold of SCR 118. SCR 118 thus turns on and energizes trip solenoid 117, which opens main contact switch 102 and disconnects power from the load. This indicates a successful manual test initiated by the user. Should differential current sensing transformer 108 and/or ground fault detection circuit 114 malfunction and not generate a signal at node DETECT, SCR 118 will then remain off and not energize trip solenoid 117. This indicates that GFCI 100 is defective and should be replaced by the user. As an option in some embodiments, self-test controller 122 may assert a signal to alarm/trip circuit 124 after a test time period (of about 25 msec in some embodiments) has elapsed to activate an audible or visual alarm to also indicate that GFCI 100 is defective. Note that this signal to alarm/trip circuit 124 should not result in a signal coupled to node TRIP that results in tripping open main contact switch 102 in order to avoid confusion wherein a user would mistake this tripping for a self test pass result.

Figure 8:
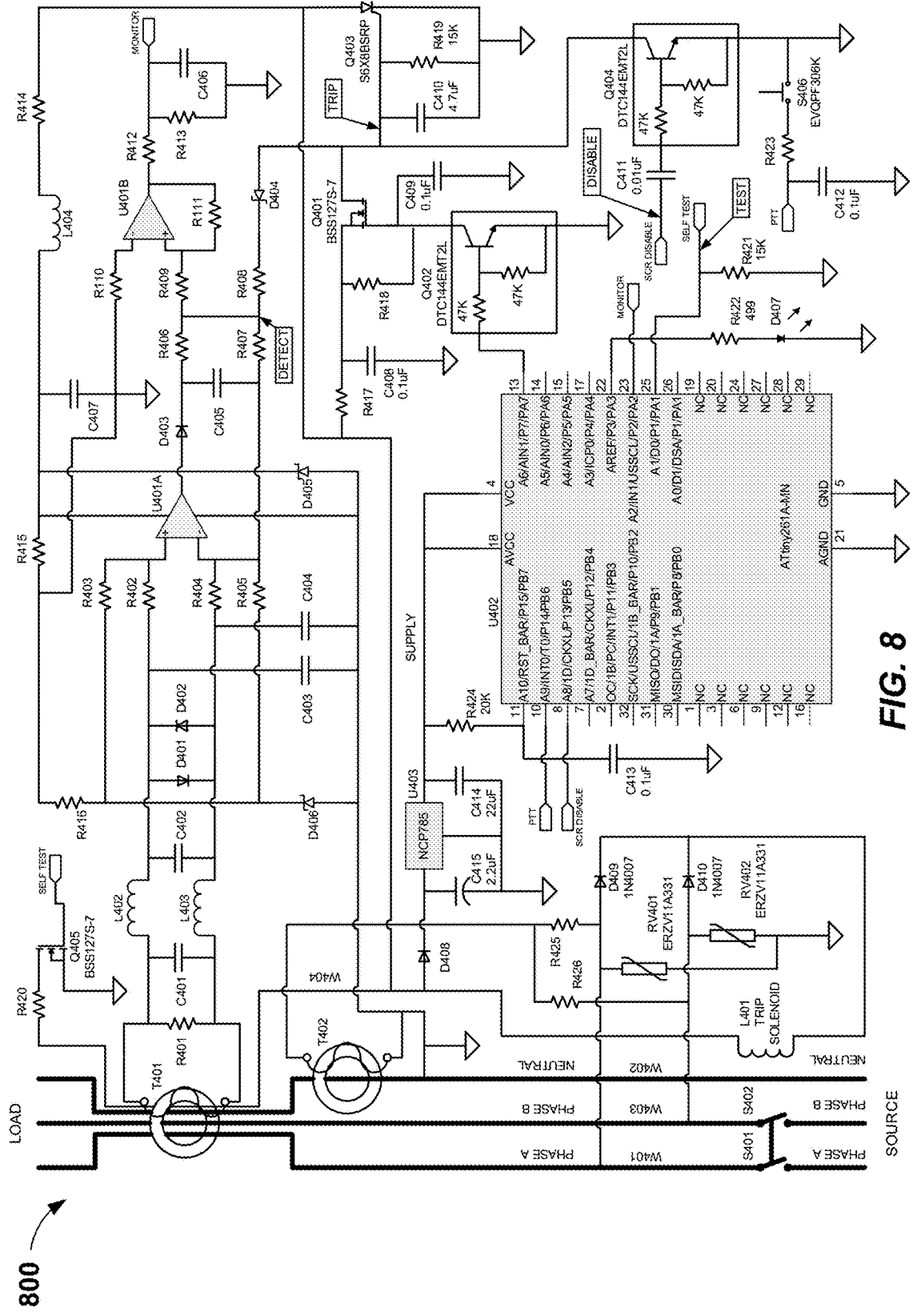
FIG. 8 illustrates a schematic diagram of a second GFCI according to embodiments.

Note that embodiments of this disclosure are not limited to single phase 120 VAC systems. FIG. 8 illustrates a multi-phase GFCI 800 with an automatic self-test feature for a 2-pole 120/208/240 VAC electrical circuit (e.g., load) in accordance with one or more embodiments. GFCI 800 includes a ground fault sensing circuit that has a current sensing transformer 1401 and a burden resistor R401. GFCI 800 also includes two hot conductors, Phase A hot conductor W401 and Phase B hot conductor W403. GFCI 800 further includes a neutral conductor W402 and a test conductor W404 for passing test current through current sensing transformer T401. A second current transformer T402 in GFCI 800 has neutral conductor W402 passing there through to couple current onto neutral conductor W402 should a grounded neutral wiring fault occur. The current coupled onto neutral conductor W402 is generated by resistor R425, which has one terminal electrically connected to Phase A hot conductor W401 and its other terminal electrically connected to one terminal of second current transformer T402. The current coupled onto neutral conductor W402 also generated by a larger value resistor R426, which has one terminal electrically connected to Phase B hot conductor W403 and its other terminal electrically connected to the same terminal of second current transformer T402. The other terminal of second current transformer T402 is electrically connected to neutral conductor W402. The resistor values of resistors R425 and R426 are different to create an imbalance of current generated from Phase A and Phase B so that current may always be generated regardless of configuration (Phase A and Phase B, Phase A only, Phase B only, 120 VAC, 208 VAC, or 240 VAC).

The ground fault sensing circuit of GFCI 800 is electrically coupled to a ground fault detection circuit of GFCI 800. The ground fault detection circuit includes a filter circuit and a half-wave amplifier circuit or a full-wave rectifying amplifier). The filter circuit includes capacitors C401 and C402 and inductors L402 and L403. The half-wave amplifier circuit includes operational amplifier U401A, input limiter diodes D401 and D402, rectifying diode D403, gain setting resistors R402, R404, R406, R407, and an additional filter capacitor C405 for filtering high frequencies. Zener diode D405 sets the power supply voltage for operational amplifier U401A and U401B (configured as a comparator), and Zener diode D406 sets the operating bias voltage of the half-wave amplifier circuit. The output of the ground fault detection circuit at node DETECT is electrically coupled to a trip circuit of GFCI 800.

The trip circuit includes an SCR Q403, a capacitor C410, a resistor R419, and a trip solenoid L401 through Zener diode D404 and resistor R408 at node TRIP. Zener diode D404 removes the operating bias voltage of the half-wave amplifier circuit. Trip solenoid L401 strikes a trip arm that opens two main contacts S401 and S402 to remove power from a load.

GFCI 800 also includes a self-test controller U402, which may be a microprocessor and in some embodiments may be part number ATtiny261A-MN, manufactured by ATMEL. Self-test controller U402 may alternatively be a custom digital logic circuit.

Figure 9:
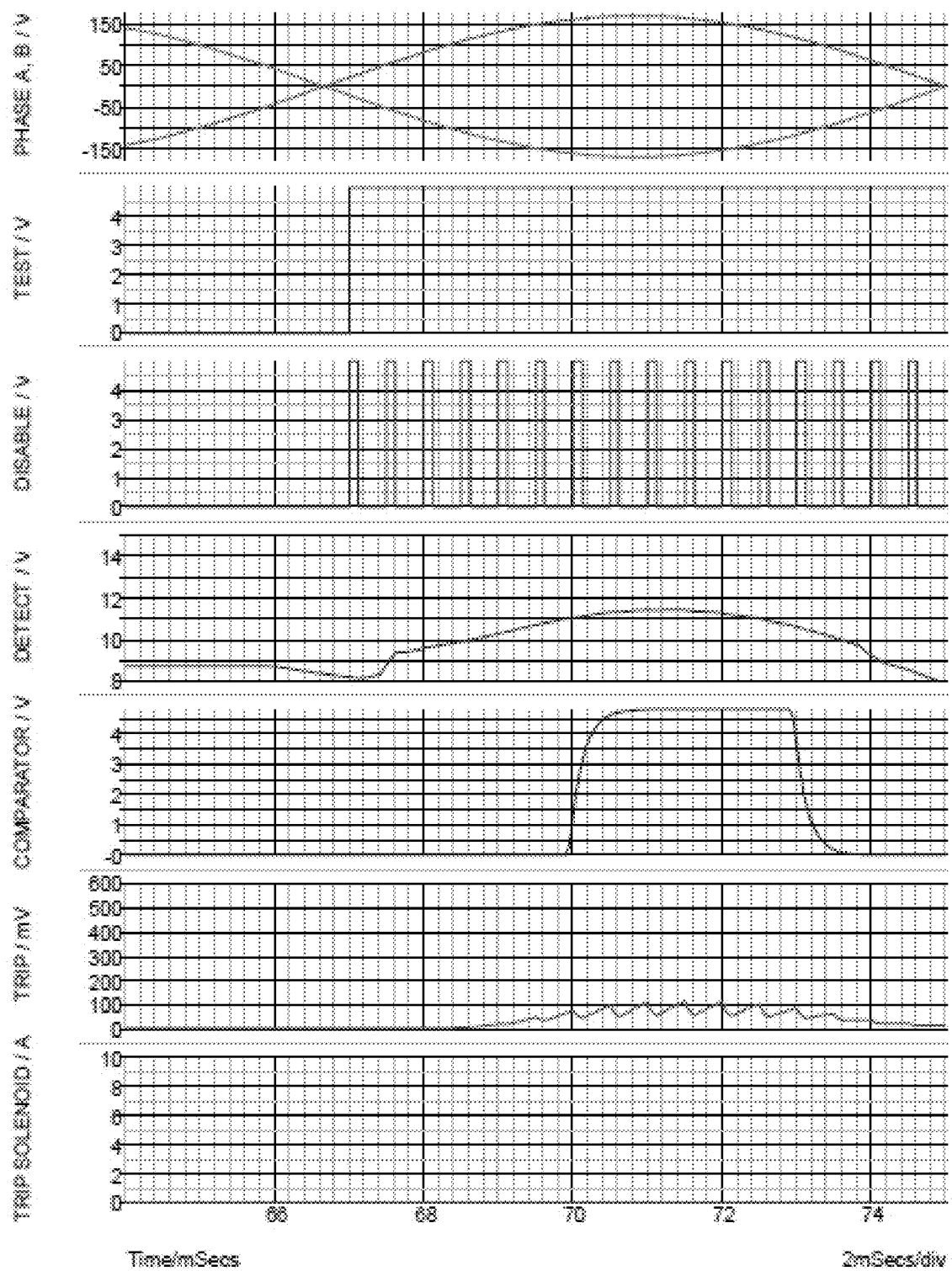
FIG. 9 illustrates signal waveforms of a self test in the GFCI of FIG. 8 according to embodiments.

During a self test, self-test controller U402 asserts a signal at node TEST, turning on MOSFET Q405. This allows full wave rectified test current to flow through test conductor W404. The test current passes through current sensing transformer T401 while simultaneously asserting a clock signal on node DISABLE, which is electrically coupled and differentiated to switching circuit Q404 through capacitor C411. Switching circuit Q404 turns on briefly at the leading edge of every clock pulse, discharging capacitor C410 at node TRIP, which prevents the voltage from exceeding the gate turn-on voltage of SCR Q403, as shown in FIG. 9, which illustrates signal waveforms of GFCI 800 in accordance with one or more embodiments. This is similar to the operation of GFCI 100 (a 1-pole device) as shown in FIGS. 1 and 2. The output of the ground fault detection circuit at node DETECT is electrically coupled to self-test controller U402 through a comparator which includes an operational amplifier U401B and resistors R409, R410, R411, R412, and R413, and capacitor C406. Resistors R412 and R413 form a voltage divider to provide, in some embodiments, a 5 volt input into the self-test controller U402. Capacitor C406 is included to form a low pass filter. Also included in this embodiment is a push button S406, which may be part number EVQPF306K manufactured by Panasonic. Push button S406 is electrically coupled to self-test controller U402 through a low pass filter formed by a series resistor R423, which may be 1 kΩ, and a shunt capacitor C412, which may be 0.1 µF. Other values may be used in other embodiments.

A user can initiate a manual test by pressing push button S406, which couples a logic low level or 0 V into self-test controller U402. A user-initiated manual test functions in the same manner as described above in connection with GFCI 100. The alarm in this embodiment is a visual indicator that may include a 499Ω current limiting resistor R422 and a light emitting diode (LED) D407. A logic high level (which may be +5 V in some embodiments) is asserted by self-test controller U402 when a self test fails to illuminate LED D407. The visual indicator can be made to appear flashing on and off by self-test controller U402 by pulsing the signal asserted to the alarm when a self test fails. When a self test fails that was automatically initiated by self-test controller U402, self-test controller U402 also asserts a second alarm signal, which is coupled to the trip circuit through switching circuit Q402 and MOSFET Q401. In some embodiments, switching circuit Q402 may be part number DTC144EMT2L, manufactured by Rohm. In some embodiments, MOSFET Q401 may be part number BSS127S-7, manufactured by Diodes, Incorporated.

In some embodiments, self-test controller U402 asserts a logic high level (e.g., 5 V) into the input pin of switching circuit Q402, which is electrically coupled to the base of the transistor of switching circuit Q402 during normal operation. This keeps switching circuit Q402 on, electrically coupling the gate of MOSFET Q401 to neutral conductor W402. The source of MOSFET Q401 is also electrically coupled to neutral conductor W402 through resistor R419, thus MOSFET Q401 is turned off. However, when a self test fails, self-test controller U402 asserts a logic low level (which may be 0 V in some embodiments) into the input pin of switching circuit Q402, which is electrically coupled to the base of the transistor in switching circuit Q402 and turns off the transistor. This allows a capacitor C409 (which may be 0.1 µF) to charge from 120 VAC Phase A and Phase B conductors W401 and W403 through respective rectifying diodes D409 and D410, trip solenoid L401, and resistors R417 and R418. After a few cycles of Phase A and Phase B power, capacitor C409 charges to a voltage greater than 4 V, which is asserted on the gate of MOSFET Q401. This voltage exceeds the gate-to-source turn-on voltage of 4 V. As a result, MOSFET Q401 turns on and capacitor C410 (which may be 4.7 µF) begins to charge from 120 VAC Phase A and Phase B conductors W401 and W403 through respective rectifying diodes D409 and D410, trip solenoid L401, resistor R417, and MOSFET Q401. Capacitor C410 charges to a voltage on node TRIP exceeding the gate turn-on voltage of about 0.5 V of SCR Q403. SCR Q403 turns on and energizes trip solenoid L401, which opens main contact switches S401 and S402. This disconnects power from the load.

Power is supplied to the ground fault detection circuit from 120 VAC Phase A and Phase B conductors W401 and W403 through respective rectifying diodes D409 and D410, trip solenoid L401, current limiting resistor R414, and inductor choke L404. Power is supplied to self-test controller U402 from 120 VAC Phase A and Phase B conductors W401 and W403 through respective rectifying diodes D409 and D410, trip solenoid L401, and a 5 VDC regulator circuit that includes a diode D408, capacitors C414 and C415, and a voltage regulator U403, which may in some embodiments be part number NCP785 manufactured by ON Semiconductor. GFCI 800 also includes a pair of metal-oxide-varistors (MOV) RV401 and RV402 with one terminal of RV401 electrically connected to 120 VAC Phase A conductor W401 and the other terminal of RV401 connected to neutral conductor W402, while one terminal of RV402 is electrically connected to 120 VAC Phase B conductor W403 and the other terminal of RV402 is connected to neutral conductor W402.

Figure 10:
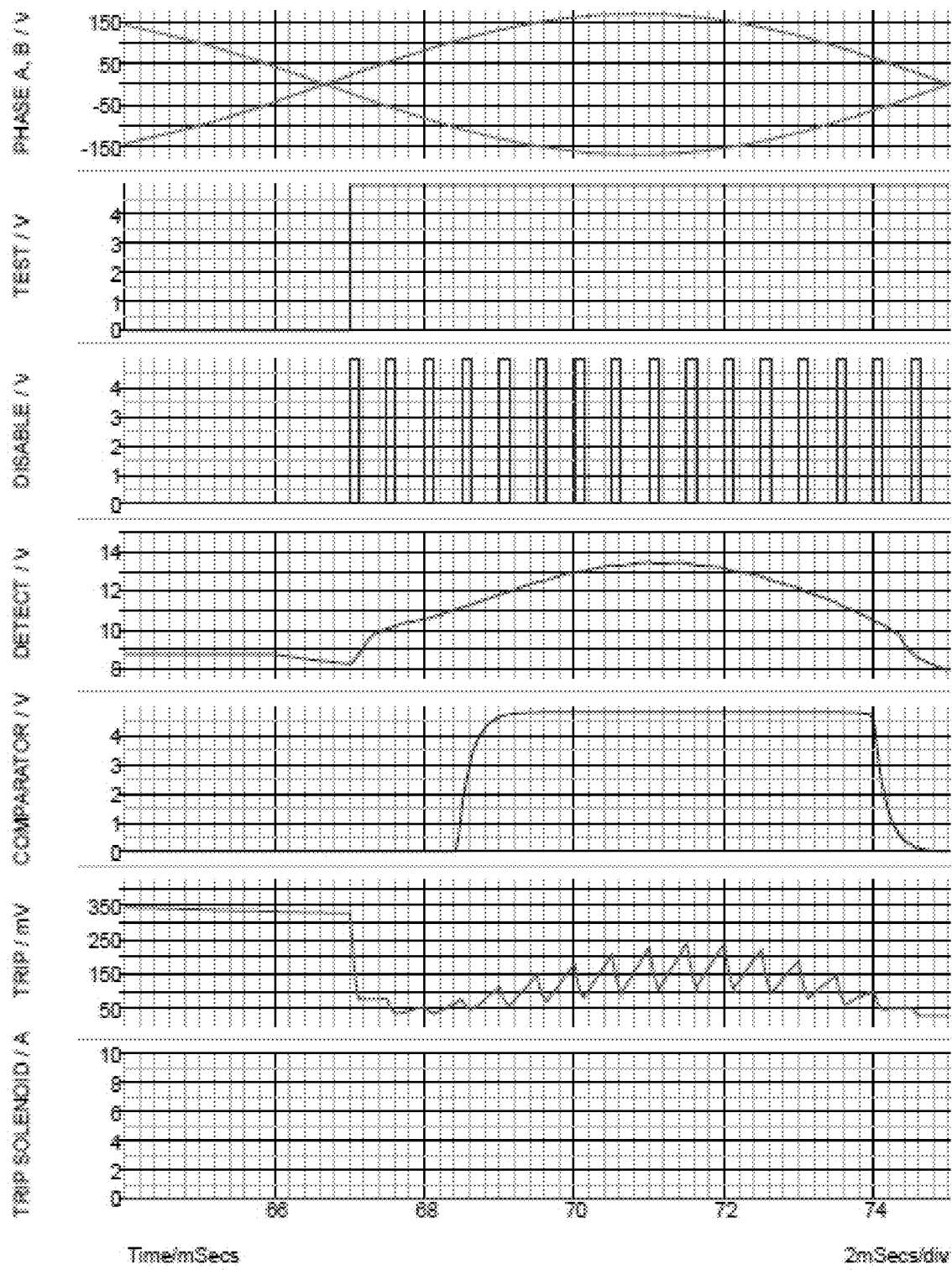
FIG. 10 illustrates signal waveforms of the GFCI of FIG. 8 responding to a below-threshold ground fault occurring during a self test according to embodiments.

FIG. 10 illustrates various signal waveforms of GFCI 800 during a self test with a below-threshold (e.g., nearly 4 mA) ground fault current present. As shown, the voltage at node TRIP does not exceed the gate turn-on. voltage (about 0.5 V) of SCR Q403, thus preventing SCR Q403 from turning on and energizing trip solenoid L401.

Figure 11:
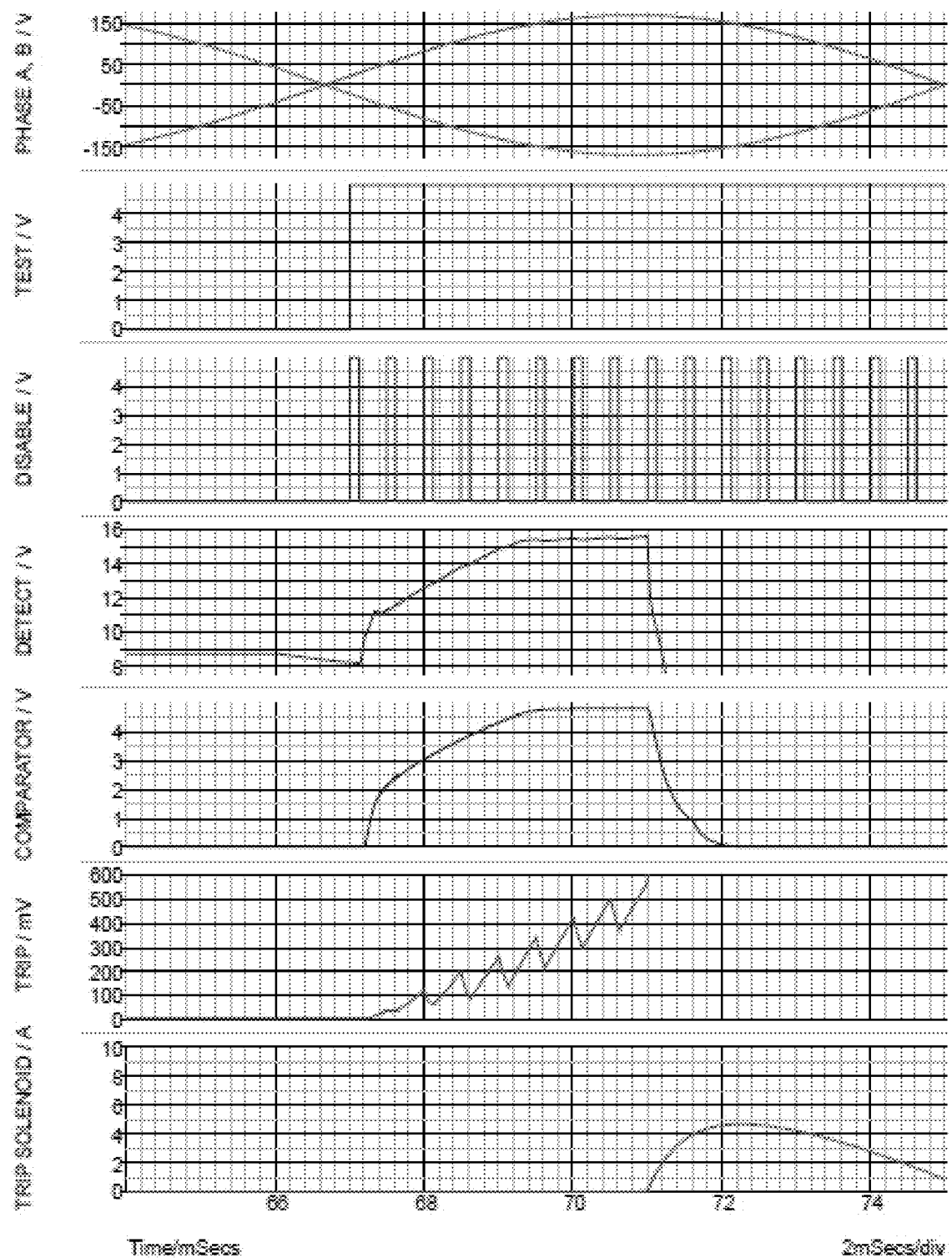
FIG. 11 illustrates signal waveforms of the GFCI of FIG. 8 responding to a large ground fault occurring during a self test according to embodiments.

FIG. 11 illustrates various signal waveforms of GFCI 800 during a self test with a dangerous ground fault of 264 mA occurring at the same time the self test is initiated. As shown, the voltage at node TRIP exceeds the gate turn-on voltage (about 0.5 V) of SCR Q403, thus turning on SCR Q403 and energizing trip solenoid L401, which opens man contact switches S401 and S402, disconnecting power from the load in less than 25 milliseconds as required by UL 943.

Figure 12:
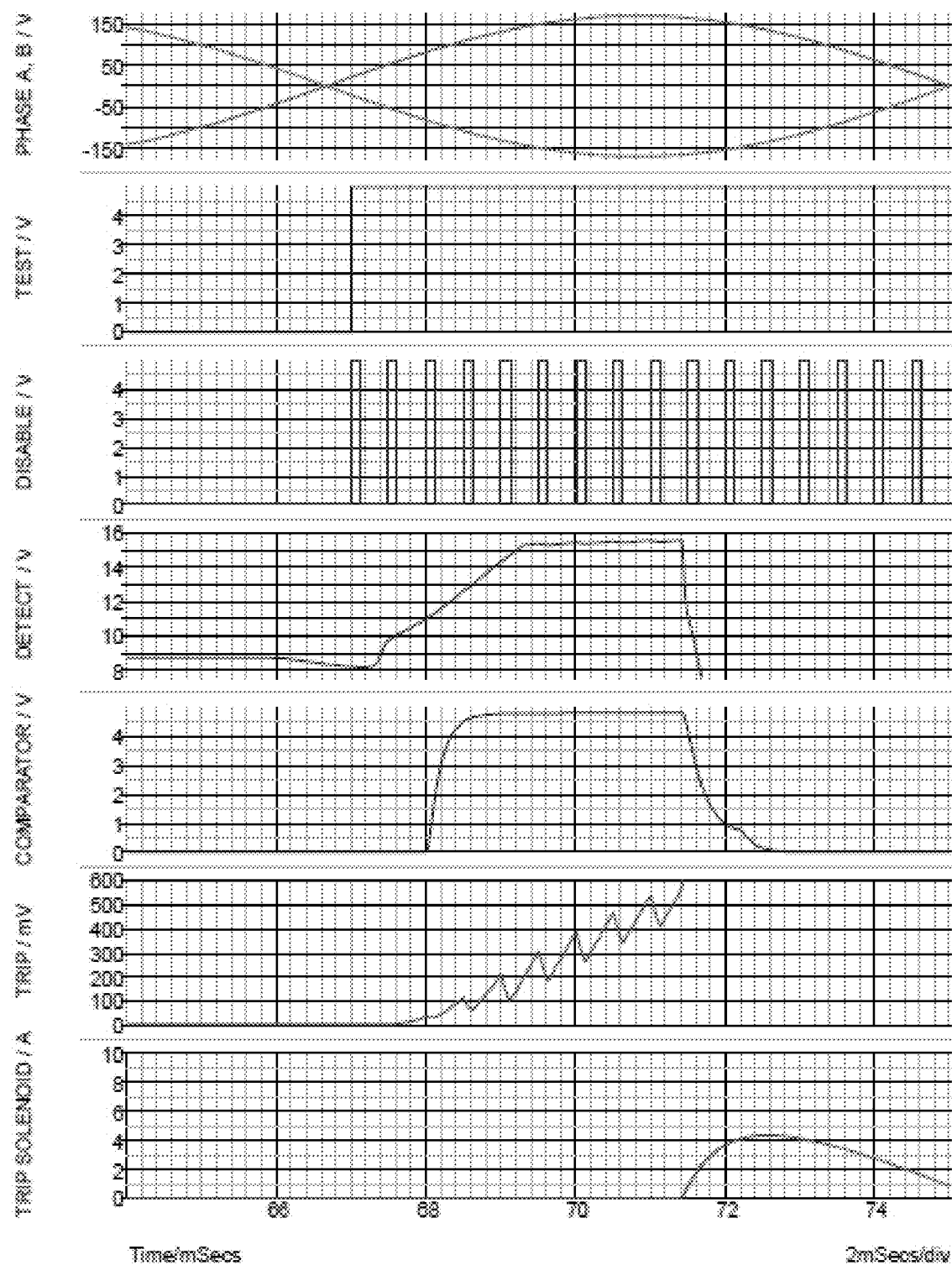
FIG. 12 illustrates signal waveforms of the GFCI of FIG. 8 responding to an above-threshold ground fault occurring during a self test according to embodiments.

FIG. 12 illustrates various signal waveforms of GFCI 800 during a self test with a ground fault current of 20 mA occurring at the same time a self test is initiated. As shown, the voltage at node TRIP exceeds the gate turn-on voltage (about 0.5 V) of SCR Q403, thus turning on SCR Q403 and energizing the trip solenoid L401, which opens main contact switches S401 and S402, disconnecting power from the load in less than 25 milliseconds. The trip time required by UL 943 is 1 second for 20 mA ground fault as defined by Equation 1 above.

For ground fault currents between 6 mA and 20 mA that occur at the same time a self test is initiated, GFCI 800 has ample time to execute the self test and then respond to the ground fault and trip open the main contact switches to disconnect power from the load.

In addition, the signal asserted on node DISABLE may be generated by individual lines of code in software for self-test controller U402. This ensures that the signal asserted on node DISABLE during self test will either be a logic high level (e.g., 5 V) or a logic low level (e.g., 0 V) should self-test controller U402 malfunction or the software execution cause a stuck signal level on node DISABLE during a self test. Such a stuck signal level may be caused by an environmental condition such as a transient surge voltage or an end of life electrical component failure in GFCI 800. Subsequently, this allows GFCI 800 to continue functioning normally such that power can be disconnected from a load should a dangerous ground fault condition occur.

Figure 13:
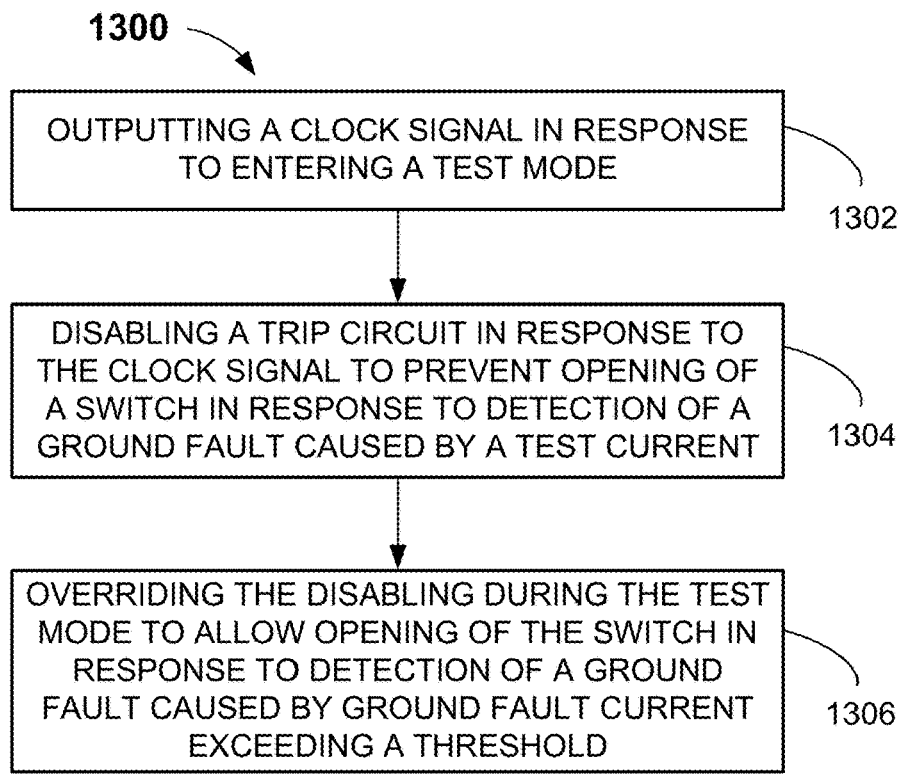
FIG. 13 illustrates a flowchart of a method of disabling a trip circuit in a ground fault circuit interrupter according to embodiments.

FIG. 13 illustrates a flowchart of a method 1300 of disabling a trip circuit in a ground fault circuit interrupter in accordance with one or more embodiments. Method 1300 may include at process block 1302 outputting a clock signal in response to entering a test mode of the ground fault circuit interrupter. For example, as shown in FIGS. 1 and 2, self-test controller 122 may output a clock signal on node DISABLE upon entering a test mode to perform a self test.

At process block 1304, method 1300 may include disabling a trip circuit of the ground fault circuit interrupter in response to the outputting of the clock signal to prevent opening of a switch coupled between a power source and a load in response to detection of a ground fault caused by a test current. For example, as again shown in FIGS. 1 and 2, trip circuit 116 may be disabled by the clock signal on node DISABLE turning on repeatedly and briefly switching circuit 128 at the leading edge of every pulse of the clock signal. This prevents the signal on node TRIP from charging capacitor 120 to a turn-on threshold, which keeps SCR 118 off, trip solenoid de-energized, and main contact switch 102 closed.

And at process block 1306, method 1300 may include overriding the disabling of the trip circuit during the test mode to allow the opening of the switch in response to detection of a ground fault caused by a ground fault current exceeding a threshold. For example, referring to FIGS. 1 and 4, the signal on node DETECT causes capacitor 120 (see node TRIP) to repeatedly charge and partially discharge such that capacitor 120 charges to a turn-on threshold (see Gate Threshold in FIG. 4). This causes SCR 118 to turn on, energizing trip solenoid 117, which opens main contact switch 102, disconnecting power from the load.

Figure 14:
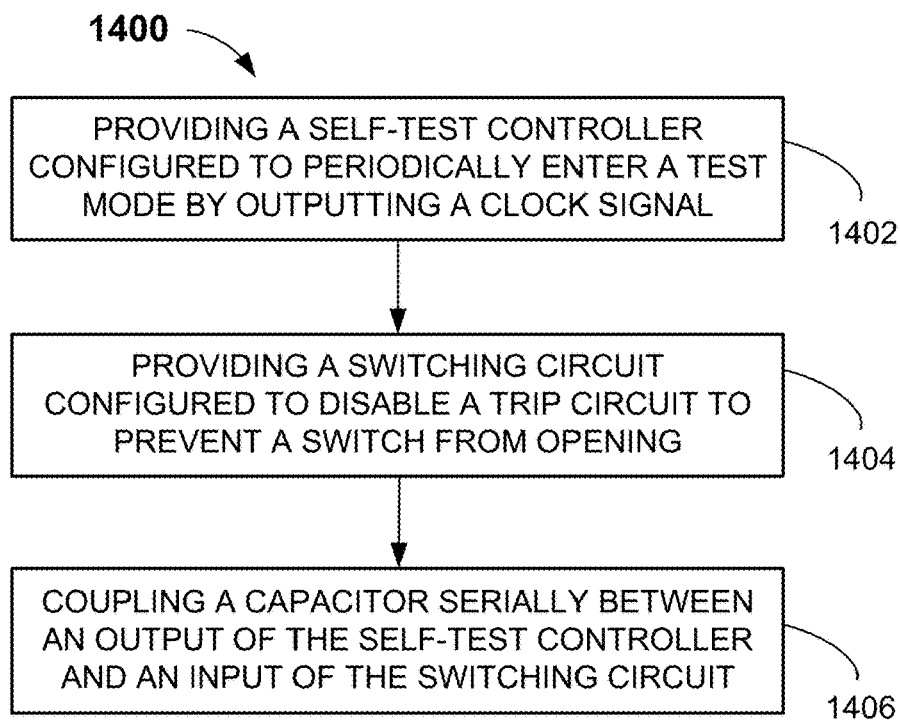
FIG. 14 illustrates a flowchart of a method of assembling a ground fault circuit interrupter according to embodiments.

FIG. 14 illustrates a flowchart of a method 1400 of assembling a ground fault circuit interrupter in accordance with one or more embodiments. Method 1400 may include at process block 1402 providing a self-test controller configured to periodically enter a test mode by outputting a clock signal at an output of the self-test controller. For example, as shown in FIG. 1, self-test controller 122 of GFCI 100 may be provided that is configured to periodically enter a test mode to perform a self test by outputting a clock signal on node DISABLE (see FIG. 2).

At process block 1404, method 1400 may include providing a switching circuit configured to disable a trip circuit to prevent a switch coupled between a power source and a load from opening. For example, switching circuit 128 of GFCI 100 (see FIG. 1) may be provided. Switching circuit 128 is configured to disable trip circuit 116 to prevent main contact switch 102 from opening during a self test wherein a test current is used to create a ground fault.

And at process block 1406, method 1400 may include coupling a capacitor serially between the output of the self-test controller and an input pin of the switching circuit. As shown in FIG. 1, for example, capacitor 142 serially coupled between an output (i.e., node DISABLE) of self-test controller 122 and an input pin of switching circuit 128.

The above process blocks of method 1400 may be executed or performed in an order or sequence not limited to the order and sequence shown and described. For example, in some embodiments, process block 1402 may be performed after or in parallel with process block 1404.

The foregoing description describes only example embodiments of the disclosure. Modifications of the above-disclosed apparatus, systems, and methods may fall within the scope of the disclosure. For example, this disclosure is applicable to GFCIs operating on AC or DC electrical systems and/or GFCIs operating on 3-phase power systems wherein three hot conductors (e.g., Phases A, B, and C) may pass through a current sensing transformer, such as current sensing transformer T401, with or without a neutral conductor also passing through the current sensing transformer. Accordingly, while example embodiments of the disclosure have been described, it should be understood that other embodiments may fall within the scope of the disclosure, as defined by the following claims.

What is claimed is:

1. A ground fault circuit interrupter, comprising:
    a ground fault detection circuit configured to output a ground fault signal in response to detecting a ground fault caused by a test current or a ground fault current;
    a trip circuit configured to open a switch coupled between a power source and a load in response to receiving the ground fault signal;
    a self-test controller configured to periodically enter a test mode by outputting a clock signal; and
    a switching circuit configured to receive the clock signal and to respond thereto by disabling the trip circuit to prevent the opening of the switch in response to the detecting of the ground fault caused by the test current; wherein:
    the trip circuit is further configured to open the switch in response to the detecting of the ground fault caused by the ground fault current exceeding a threshold during the test mode.

2. The ground fault circuit interrupter of claim 1, further comprising a capacitor coupled in series between an output of the self-test controller and an input of the switching circuit.

3. The ground fault circuit interrupter of claim 1, wherein the clock signal has a duty cycle ranging from 24% to 26% and a frequency ranging from of 1.8 kHz to 2.2 kHz.

4. The ground fault circuit interrupter of claim 1, wherein the threshold ranges from 20 mA to 264 mA.

5. The ground fault circuit interrupter of claim 1, wherein the ground fault detection circuit comprises a filter and a half-wave amplifier or a full-wave rectifying amplifier.

6. The ground fault circuit interrupter of claim 1, wherein the trip circuit comprises a solenoid, a silicon or semiconductor controlled rectifier configured to energize the solenoid in response to the silicon or semiconductor controlled rectifier turning on, and a resistor and a capacitor each coupled in parallel to a gate terminal and a cathode terminal of the silicon or semiconductor controlled rectifier, the gate terminal comprising an input of the trip circuit.

7. The ground fault circuit interrupter of claim 1, wherein the switching circuit comprises a bipolar transistor, a first resistor, and a second resistor, wherein the first resistor is coupled in series between a base and an emitter of the bipolar transistor, and the second resistor is coupled in series between an input pin of the switching circuit and the base.

8. The ground fault circuit interrupter of claim 1, further comprising a comparator having an input coupled to an output of the ground fault detection circuit and having an output coupled to an input of the self-test controller.

9. The ground fault circuit interrupter of claim 1, further comprising an alarm/trip circuit coupled to receive an alarm signal from the self-test controller.

10. The ground fault circuit interrupter of claim 1, further comprising a differential current sensing transformer coupled to an input of the ground fault detection circuit, wherein the self-test controller is further configured to output a test signal in response to entering the test mode, the test signal configured to cause the test current to flow through the differential current sensing transformer.

11. The ground fault circuit interrupter of claim 1, further comprising:
    a differential current sensing transformer coupled to an input of the ground fault detection circuit;
    a hot conductor and a neutral conductor each passing through the differential current sensing transformer, the hot and neutral conductors representing single phase power; and
    a test conductor passing through the differential current sensing transformer.

12. The ground fault circuit interrupter of claim 1, further comprising
    a differential current sensing transformer coupled to an input of the ground fault detection circuit;
    at least one hot conductor and a neutral conductor or at least two hot conductors each passing through the differential current sensing transformer, the at least two hot and neutral conductors representing multi-phase power; and
    a test conductor passing through the differential current sensing transformer.

13. A method of disabling a trip circuit in a ground fault circuit interrupter, comprising:
    outputting a clock signal in response to entering a test mode of the ground fault circuit interrupter;
    disabling a trip circuit of the ground fault circuit interrupter in response to the outputting of the clock signal to prevent opening of a switch coupled between a power source and a load in response to detection of a ground fault caused by a test current; and
    overriding the disabling of the trip circuit during the test mode to allow the opening of the switch in response to detection of a ground fault caused by a ground fault current exceeding a threshold.

14. The method of claim 13, further comprising outputting a test ground fault signal by a ground fault detection circuit of the ground fault circuit interrupter during the test mode in response to the detection of the ground fault caused by the test current.

15. The method of claim 13, further comprising outputting a ground fault signal by a ground fault detection circuit of the ground fault circuit interrupter during the test mode in response to the detection of the ground fault caused by the ground fault current exceeding the threshold.

16. The method of claim 13, wherein the disabling of the trip circuit comprises repeatedly charging and discharging a capacitor of the trip circuit such that the capacitor does not charge to a turn-on threshold that causes the switch coupled between the power source and the load to open.

17. The method of claim 13, wherein the overriding of the disabling of the trip circuit comprises repeatedly charging and partially discharging a capacitor of the trip circuit such that the capacitor charges to a turn-on threshold that causes the switch coupled between the power source and the load to open.

18. A method of assembling a ground fault circuit interrupter, comprising:
  providing a self-test controller configured to periodically enter a test mode by outputting a clock signal at an output of the self-test controller;
  providing a switching circuit configured to disable a trip circuit to prevent a switch coupled between a power source and a load from opening; and
  coupling a capacitor serially between the output of the self-test controller and an input pin of the switching circuit.

19. The method of claim 18, further comprising:
  providing a ground fault detection circuit having an output, the ground fault detection circuit configured to output a ground fault signal at the output in response to detecting a ground fault caused by a test current or a ground fault current;
  coupling the output of the ground fault detection circuit to the trip circuit;
  providing a comparator having an input and an output; and
  coupling the input of the comparator to the output of the ground fault detection circuit and coupling the output of the comparator to an input of the self-test controller.

20. The method of claim 18, further comprising:
  providing the trip circuit wherein the trip circuit includes a capacitor having a terminal; and
  coupling the terminal of the capacitor to the switching circuit and to an output of a ground fault detection circuit, the capacitor configured to:
    repeatedly charge and discharge during the test mode such that the capacitor does not charge to a turn-on threshold in response to detection of a ground fault caused by a test current; and
    repeatedly charge and partially discharge during the test mode such that the capacitor charges to a turn-on threshold in response to detection of a ground fault caused by a ground fault current exceeding a threshold.

* * * * *